United States Patent
Dobson et al.

(10) Patent No.: US 7,076,387 B2
(45) Date of Patent: Jul. 11, 2006

(54) METHOD FOR DETERMINING THE EQUIVALENCY INDEX OF PRODUCTS AND PROCESSES

(75) Inventors: Joel L. Dobson, Rowlett, TX (US); Eugene Y. Wang, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 219 days.

(21) Appl. No.: 10/735,942

(22) Filed: Dec. 15, 2003

(65) Prior Publication Data

US 2005/0142670 A1 Jun. 30, 2005

(51) Int. Cl.
*G01D 3/00* (2006.01)
*G01M 19/00* (2006.01)

(52) U.S. Cl. ..................................... 702/108
(58) Field of Classification Search .............. 702/108
See application file for complete search history.

(56) References Cited

U.S. PATENT DOCUMENTS 5,596,187 A * 1/1997 Di Stefano et al. ...... 250/222.1
2003/0229462 A1* 12/2003 Wang .......................... 702/81

* cited by examiner

*Primary Examiner*—Bryan Bui
*Assistant Examiner*—Demetrius R. Pretlow
(74) *Attorney, Agent, or Firm*—Yingsheng Tung; Wade James Brady, III; Fredrick J. Telecky, Jr.

(57) ABSTRACT

A method is disclosed wherewith a person skilled in the art of statistical quality control may use to determine whether a process or a product is statically equivalent to another of known quality, or conforms to a desired known quality. The method may also be used to determine whether multiplicities of products or processes are statistically equivalent to one another. The method makes the determination based calculating an equivalency index that is associated with the measured parametric data, the population ratio of data points within a set of parametric limits.

24 Claims, 2 Drawing Sheets

METHOD FOR DETERMINING THE EQUIVALENCY INDEX OF PRODUCTS AND PROCESSES

BACKGROUND OF THE INVENTION

1. Field of the Invention

This invention is related to field of statistical quality control and more specifically related to a method of determining the degree of equivalency between products and between processes.

2. Description of the Related Art

Each item of manufacture, each service rendered, and each process of manufacture possesses a number of measurable attributes that jointly constitute what a user considers as quality. These attributes are often called quality characteristics. Quality characteristics may be physical such as length, weight, voltage, and viscosity, or sensory such as taste, appearance, color, and ease of use, or time orientation such as reliability, and durability.

In the past, the buyers of a product were advised to examine and test the product for quality before a purchase. Over time, market competition has shifted that burden to the producers. Today's manufacturers not only must screen their products to keep any out-of-spec parts from reaching their customers, they must also systematically monitor their manufacturing process for continuous quality improvement in order to compete in the marketplace.

Statistical tools have been developed to aid this endeavor and are commonly used in manufacturing, for example, automobiles, computers, clothing, and in the field-services. They are also used by providers of services such as utilities, Internet services, telephone services, public transportation, banking, health services, and accounting. Among the tools that are prevalent among the practitioners of statistical quality control are the control chart, the Pareto diagram, the scatter plot, the histogram, the experimental design, and the acceptance sampling.

Practitioners use these tools to study the causes of quality variation in their products. Once the causes are identified, the producers may make necessary adjustments to reduce the variation. The application of these tools, however, has a common shortcoming—they are less effective in quantifying the quality-equivalency among products—a necessity in today's commerce.

Today, producers often manufacture their goods in multiple sites, often in distant parts of the world; service providers may be operating in diverse geographical locations. Yet, they must maintain their products at the same specified quality standard. For example, a customer will expect the same quality of food and service from a restaurant in Tokyo, Japan as he does in a restaurant in Guadalajara, Mexico—if the restaurants bear the same name. A microcontroller-chip maker in Taiwan who tries to qualify as a supplier to a German customer must demonstrate that its chips meet the customer's specification and are equal, statistically speaking, to the parts the customer currently buys from other venders. The traditional statistical quality control methods and tools are less useful for such purposes—it is difficult with traditional tools to compare products or processes and to reach an unambiguous conclusion as to the degree of equivalency between the compared items and to express it in a concise and numerical format.

Examples of such occasion are abundant: an owner or operator of a plant may need to judge the quality of a potential electricity supplier in terms of fluctuation of the supplied voltage over time and compare that to the current supplier; an electronic system maker may need to judge the quality-equivalency of the printed circuit-board from a new vendor in terms of the thickness variation of the board in view of his production equipment specifications; other examples include the fill-volume of soft drink beverage from various bottling machines, the net weight of a dry leach product from multiple production lines, the tensile strength of alternative new alloy materials for an automotive engine part, the time to failure of an electronic component from different vendors, and the results of a group of quality-control technicians in measuring the surface finish of a metal part.

BRIEF SUMMARY OF THE INVENTION

It is the object of this invention to provide a method with which a person of ordinary skill in the area of statistical quality control can determine whether a product or process is statistically equivalent to another.

It is also the object of this invention to provide a method with which a person of ordinary skill in the area of statistical quality control can determine whether a product or a process is statistically equal to a required standard.

It is also the object of this invention to provide a method with which a person of ordinary skill in the area of statistical quality control can determine whether a multiplicity of products, processes, or services are statistically equivalent to one another and are of a desired quality.

Patent disclosure Ser. No. 10/164,519 describes several methods to determine the quality-equivalency of products and processes when measurements of quantifiable parameters fit a distribution curve. This invention describes methods to determine quality-equivalency without requiring the measured data to fit any mathematical distribution.

DETAILED DESCRIPTION OF THE INVENTION

Figure 1:
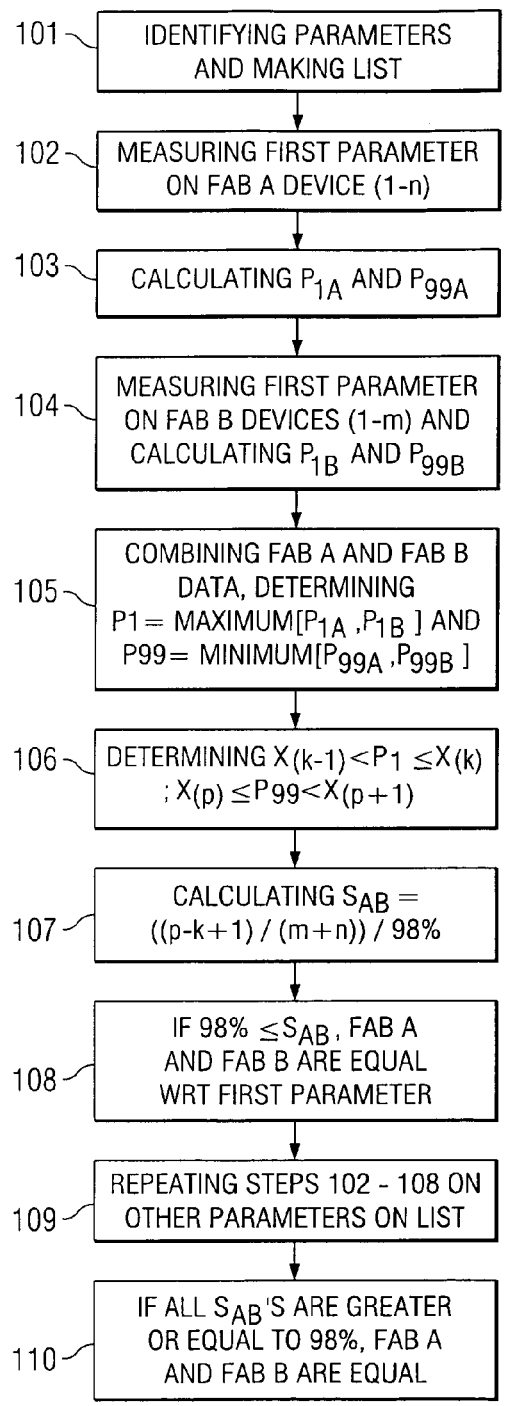
FIG. 1 depicts the steps of a method for determining the quality-equivalency of a process in two semiconductor IC fabrication facilities.

FIG. 1 depicts an example of the first embodiment of this invention. In this example, the steps of a method are described with which an IC device manufacturer may determine whether IC devices fabricated at two of its manufacturing facilities (FABs) are statistically equivalent. The invention applies to situations where more than two FABs are compared. This two-FAB example is for illustrative purpose.

In step 101, the method requires one to identify one or more measurable and quantifiable device-parameters that, in total, reflect the quality of the devices. The number of parameters that are necessary to make this equivalency determination may be large or small, depending on the complexity of the process and the economy of the operation. In modern semiconductor integrated circuit products, one may choose parameters of a typical transistor in the integrated circuit, such as the transistor channel length, the gate oxide thickness, the drive current, gate to substrate leakage current etc.

In step 102, one takes measurements of a first parameter identified in step 101. As an example, one may choose the transistor drive-current as the measuring parameter of a group of IC devices fabricated at a first facility, FAB A. The measurement may require hand probing by an operator if the sample size is small. Otherwise, it may require an automated system that incorporates automated testing system for data acquisition and computer system for processing the data.

In step 103, one records and arranges the measured data orderly and seeks an upper and a lower limit based on the data. Again, depending on the sample size, the recording may be in a laboratory notebook, a personal computer, or a fully automated system. In this example, the upper limit ($P_{99A}$) is the $99^{th}$ percentile value of the array and the lower limit ($P_{1A}$) is the first percentile value.

In step 104, one repeats the measurement and recording procedure on a group of devices fabricated at a second facility, FAB B. And as in step 103, one selects a upper and a lower limit based on the measured data. In this example, the first ($P_{1B}$) and the $99^{th}$ ($P_{99B}$) percentile values are selected.

In step 105, the measured data in steps 103 and 104 are arranged in one orderly array either in an ascending order or a descending order. For example, m parts from FAB A and n parts from FAB B are measured and the data are arranged in an array of ascending order so that data $X_{(1)}$ is the smallest in magnitude and data $X_{(m+n)}$ is the largest in magnitude. Also in step 105, an upper and a lower limit are selected. In this example, the selected lower limit $P_1$ is the greater of the two lower limits in steps 103 and 104, and the selected upper limit $P_{99}$ is the smaller of the two upper limits in steps 103 and 104. Mathematically, one may express the relationships as:

$$P_1 = \max [P_{1A}, P_{1B}], \tag{1}$$

$$P_{99} = \min [P_{99A}, P_{99B}]. \tag{2}$$

In step 106, one inserts the limiting points in the array and identifies the data adjacent the limiting points. In this example, data k and k-i are adjacent the lower limit $P_1$ and data p and p+1 are adjacent the upper limit $P_{99}$. Mathematically, one may express the relationships as:

$$X_{(k-1)} < P_1 \leq X_{(k)}; \text{ and} \tag{3}$$

$$X_{(p)} \leq P_{99} < X_{(p+1)}. \tag{4}$$

In step 107, one determines an index of equivalency, $S_{AB}$, based on the number of data points between the limits. In this example, there are p-k+1 data between $P_1$ and $P_{99}$, $S_{AB}$ is defined as follows:

$$S_{AB} = ((p-k+1)/(m+n))/98\%. \tag{5}$$

In step 108, one compares the equivalency-index $S_{AB}$ to a predetermined criterion to determine if FAB A and FAB B are statistically equivalent. In this example, the criterion selected is 98%. Therefore, if SAB is 98% or greater, one may declare that with respect to transistor drive current, the devices fabricated in FAB B are equivalent to the devices fabricated in FAB A.

In step 109, one repeats the measuring and recording process on the next parameter identified in step 101 and then repeats steps 102 through 108.

In step 110, one examines all the equivalency-indices and determines whether FAB A and FAB B produce devices of equal quality based on the equivalent indices of the parameters. In this example, if all $S_{AB}$'s are equal or greater than 98% we declare that the devices fabricated in FAB A are statistically equivalent to that of FAB B.

When more than 2 FABs are compared, equations (1) and (2) assume the form of $$P_1 = \max [P_{1A}, P_{1B}, P_{1C}, \ldots ], \tag{1}'$$

$$P_{99} = \min [P_{99A}, P_{99B}, P_{99C}, \ldots ]. \tag{2}'$$

Figure 2:
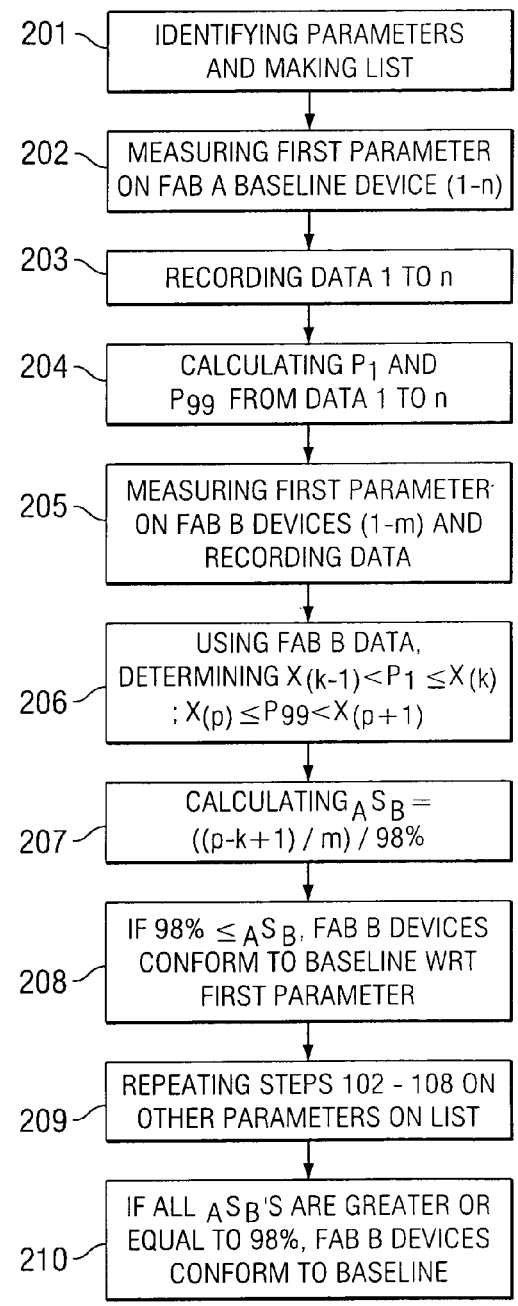
FIG. 2 depicts the steps of a method for determining the quality-equivalency of a process in a semiconductor IC fabrication facility with respect to a baseline process.

FIG. 2 depicts an example of a second embodiment of this invention. In this example, the steps of a method are described with which an IC device manufacturer may determine whether IC devices fabricated at FAB B are statistically equivalent to devices fabricated with a baseline process in FAB A, which may have been qualified by a customer. The purpose of the comparison may be to qualify a FAB B to add production capacity for the same customer.

In step 201, as in step 101, one identifies one or more measurable and quantifiable device-parameters that, in total, reflect the quality of the manufacturing process.

In step 202, as in step 102, one measures the first parameter identified in step 201. In this example, one may again choose the transistor drive-current as the parameter and measure a group of ICs manufactured in FAB A with the baseline process.

In step 203, as in step 103, one records the data.

In step 204, one selects a lower limit and an upper limit from the data. In this example, one measures m devices fabricated in FAB A selects a lower limit $P_1$ at the first percentile and an upper limit $P_{99}$ at the $99^{th}$ percentile among the data.

In step 205, one measures a group of devices manufactured at FAB B and records the data. In this example, the number of devices in this group is n.

In step 206, one arranges the data from step 205 in an array either in an ascending order or a descending order and inserts the upper and lower limits in step 204 into the array. In this example, one arranges the data from FAB B in ascending order and maps the array against $P_1$ and $P_{99}$.

If data $X_{(k)}$ and $X_{(k-1)}$ are adjacent $P_1$ and data $X_{(p)}$ and $X_{(p+1)}$ are adjacent $P_{99}$, it is said that a total of p-k+1 points are between P1 and P99. Mathematically, one may, as in step 106, express the relationships as:

$$X_{(k-1)} < P_1 \leq X_{(k)}; \text{ and} \tag{6}$$

$$X_{(p)} \leq P_{99} < X_{(p+1)}. \tag{7}$$

In step 207, one determines an quality-equivalency index, $_AS_B$, based on the number of data points between data k and data p. In this example, $_AS_B$ is defined as:

$$_AS_B = ((p-k+1)/n)/98\%. \tag{8}$$

In step 208, one selects a criterion and compares the $_AS_B$ to the criterion to determine if the devices confirm to the baseline process with respect to the parameter measured in step 202. In this example, the criterion selected is 98%. Therefore, if $_AS_B$ is 98% or greater, one may declare that with respect to transistor drive current, the devices fabricated with a process in FAB B is equivalent to the devices fabricated in FAB A with a base-line process.

In step 209, one measures the next parameter identified in step 201 and repeat steps 202 through 208.

In step 210, one examines all the equivalency indices and determines whether FAB B is capable of fabricating devices that are equivalent to the devices fabricated in FAB A with a base-line process. In this example, if all $_AS_B$'s are equal to or greater than 98%, we declare that the devices fabricated in FAB B are statistically equivalent to that of FAB A.

Figure 3:
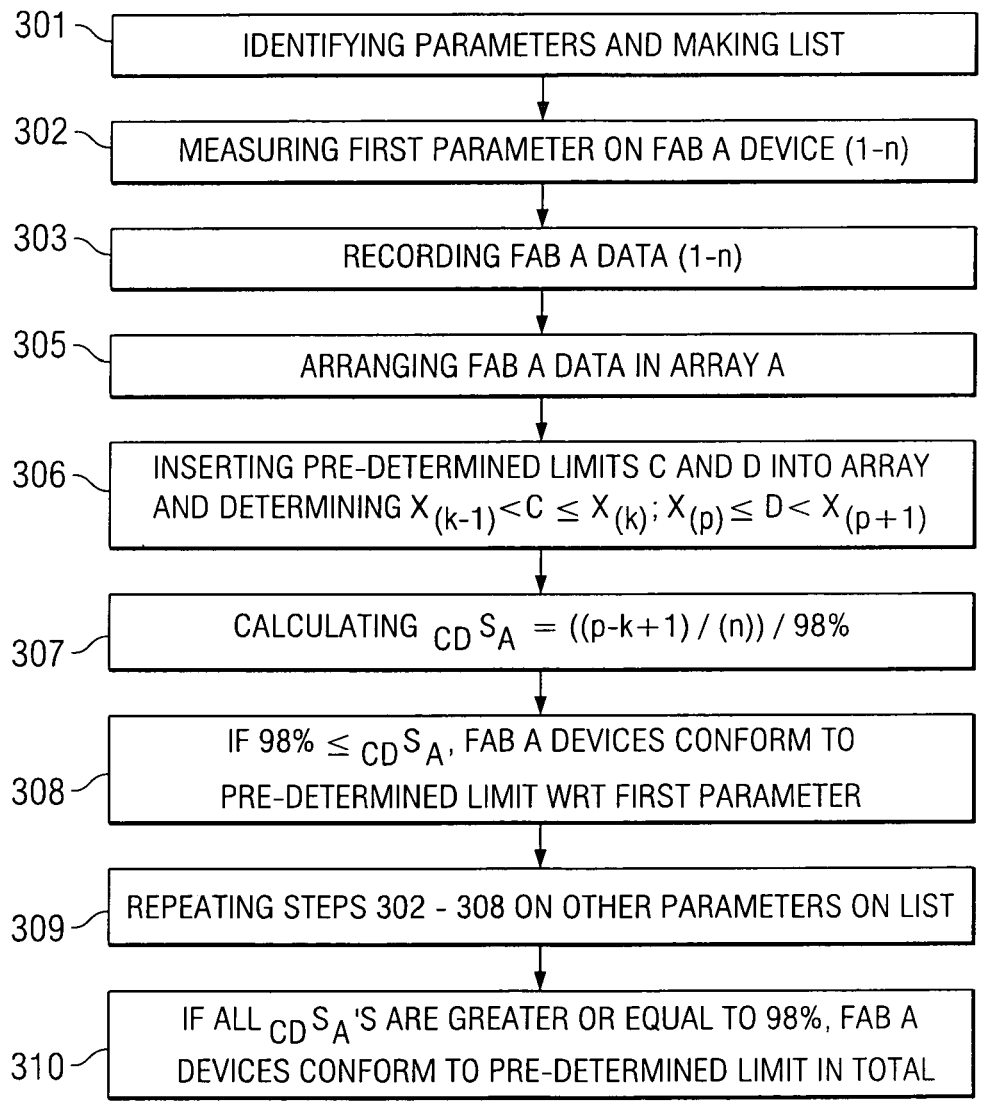
FIG. 3 depicts the steps of a method for determining the quality-equivalency of a process in multiple semiconductor IC fabrication facilities with respect to a global screen window.

FIG. 3 depicts an example of a third embodiment of this invention. In this example, the steps of a method are described with which an IC device manufacturer may determine whether devices fabricated at a FAB or at a plurality of FABs conform statistically to some pre-determined limits. The limits may be generated from a base-line process, they may be historical values, limitations supplied by a customer or it may be a mandate from a governmental regulatory agency.

In step 301, one identifies the device-parameter or parameters based on which one determines the conformity of the devices.

In step 302, as in steps 102 and 202, one measures and records the first parameter in step 301. In this example, the transistor drive-current is used again as the parameter. And the drive-currents of a group of ICs manufactured in FAB A are taken.

In step 303, as in steps 103 and 203, one records the measured data in step 302.

In step 305, one arranges the data of measurements from steps 303 in an array A, either in an ascending order or a descending order. In this example, one takes m measurements and arranges the data in a ascending order so that $X_{(1)}$ is the smallest measured value and $X_{(m)}$ is the largest measured value.

In step 306, one inserts the pre-determined values to the array. In this example, C is the lower limit and D is the upper limit. If data $X_{(k)}$ and $X_{(k-1)}$ are adjacent C and data $X_{(p)}$ and $X_{(p+1)}$ are adjacent D, it is said that a total of p−k+1 points are between C and D. Mathematically, one may, as in step 106, express the relationships as:

$$X_{(k-1)} < C \leq X_{(k)}; \text{ and} \qquad (9)$$

$$X_{(p)} < D \leq X_{(p+1)}. \qquad (10)$$

In step 307, one determines a quality-equivalency index, $_{CD}S_A$, based on the number of data points between data k and data p. In this example, $_{CD}S_A$ is defined as:

$$_{CD}S_A = ((p-k+1)/m)/98\%. \qquad (11)$$

In step 308, one selects a criterion and compares the $_{CD}S_A$ to the criterion to determine if the devices confirm to the specification with respect to the parameter measured in step 302. In this example, the criterion selected is 98%. Therefore, if $_{CD}S_A$ is 98% or greater, one may declare that with respect to transistor drive current, the devices fabricated with in FAB A conform to the pre-determined limits.

In step 309, one takes measurements of the next parameter identified in step 301 and repeat steps 302 through 308.

In step 310, one examines all equivalency indices and determines whether FAB A is capable of fabricating devices that statistically conform to the specification. In this example, if all $_{CD}S_A$'s are equal to or greater than 98% we declare that the devices fabricated in FAB A are statistically conform to the pre-determined limits in total.

The disclosures and the description herein are purely illustrative and are not intended to be in any sense limiting. A person skilled in the art of statistical quality control would be able to apply the method disclosed in the above embodiments to his or her particular product or the process with equal effectiveness.

What is claimed is:

1. A method for testing a first product based on an equivalency index associated with a parameter of the product, comprising:
   a. identifying at least one measurable parameter of the first product;
   b. measuring the parameter on a group of the first product;
   c. measuring the parameter on a group of second products possessive of known desirable quality;
   d. arranging data of steps b and c in an array having a total number of array elements;
   e. providing a numeric upper limit and a numeric lower limit relating to the array, the upper limit being greater in magnitude than the lower limit, at least one array element having a magnitude between the upper limit and the lower limit;
   f. calculating an equivalency index relating to the quotient of dividing the number of array elements greater in magnitude than the lower limit and smaller in magnitude than the upper limit by the total array elements; and
   g. providing a criterion and comparing the equivalency index to the criterion to determine whether the first product and the second product are equivalent.

2. The method of claim 1 wherein the product is an item of manufacture.

3. The method of claim 1 wherein the product is a service.

4. A method for qualifying a first process based on an equivalency index associated with a product-parameter, comprising:
   a. identifying at least one measurable parameter of a product produced with the first process;
   b. measuring the parameter on a first group of products produced with the first process;
   c. measuring the parameter on a second group of products produced with a second process having known desirable quality;
   d. arranging data of steps b and c in an array having a total number of array elements;
   e. providing a numeric upper limit and a numeric lower limit relating to the array, the upper limit being greater in magnitude than the lower limit, at least one array element having a magnitude between the upper limit and the lower limit;
   f. calculating an equivalency index relating to the quotient of dividing the number of array elements greater in magnitude than the lower limit and smaller in magnitude than the upper limit by the total array elements; and
   g. providing a criterion and comparing the equivalency index to the criterion to determine whether the first process and the second process are equivalent.

5. The method of claim 4 wherein the process is for manufacturing semiconductor integrated circuit devices.

6. The method in claim 4 wherein the products are semiconductor integrated circuit devices.

7. A method for testing a process in a first semiconductor integrated-circuit-device manufacturing facility (FAB) based on an equivalency index associated with a device-parameter, comprising:
   a. identifying at least one measurable device-parameter of a integrated circuit device;
   b. measuring the parameter on a first group of integrated circuit devices manufactured with the process in the first FAB;
   c. measuring the parameter on a second group of products produced at a second facility possessive of desirable quality;
   d. arranging data of steps b and c in an array having a total number of array elements;
   e. providing a numeric upper limit and a numeric lower limit relating to the array, the upper limit being greater in magnitude than the lower limit, at least one array element having a magnitude between the upper limit and the lower limit;

f. calculating an equivalency index relating to the quotient of dividing the number of array elements greater in magnitude than the lower limit and smaller in magnitude than the upper limit by the total array elements; and g. providing a criterion and comparing the equivalency index to the criterion to determine whether the process at the first FAB and the process at the second FAB are equivalent.

8. A method for testing a product based on an equivalency index associated with a product-parameter with a parametric upper limit and a parametric lower limit, comprising:

a. identifying at least one measurable parameter of the product;

b. measuring the parameter on a group of products;

c. arranging data of step b in an array having a total number of array elements;

d. providing a upper and a lower specification limit, the upper limit being greater in magnitude than the lower limit, at least one array element having a magnitude between the upper limit and the lower limit;

e. calculating an equivalency index relating to the quotient of dividing the number of array elements greater in magnitude than the lower limit and smaller in magnitude than the upper limit by the total array elements; and f. providing a criterion and comparing the equivalency index to the criterion to determine whether the product conforms to the specification.

9. The method in claim 8 wherein the product is an item of manufacture.

10. The method in claim 8 wherein the product is a service.

11. A method for testing a process in a first semiconductor integrated-circuit device manufacturing facility (FAB) based on an equivalency index associated with a parameter of an integrated circuit device, comprising:

a. identifying at least one measurable parameter of the integrated circuit device;

b. measuring the parameter on a first group of integrated circuit devices manufactured with said process in the FAB;

c. arranging data of step b in an array having a total number of array elements;

d. providing a numeric upper target and a numeric lower target associated with the parameter, the upper target being greater in magnitude than the lower target, at least one array element having a magnitude between the upper target and the lower target;

e. calculating an equivalency index relating to the quotient of dividing the number of array elements greater in magnitude than the lower target and smaller in magnitude than the upper target by the total array elements; and f. providing a criterion and comparing the equivalency index to the criterion to determine whether the devices from the FAB conform to the parametric targets.

12. A method for determining two products, a first product and a second product, as being equal, based on an equivalency index associated with a parameter common to the two products, comprising:

a. identifying at least one measurable parameter common to the two products;

b. measuring the parameter on a group of the first product;

c. measuring the parameter on a group of the second product;

d. arranging data of steps b and c in an array having a total number of array elements;

e. providing a numeric upper limit and a numeric lower limit associated with the parameter and relating to the array, the upper limit being greater in magnitude than the lower limit, at least one array element having a magnitude between the upper limit and the lower limit;

f. calculating an equivalency index relating to the quotient of dividing the number of array elements greater in magnitude than the lower limit and smaller in magnitude than the upper limit by the total array elements; and g. providing a criterion and comparing the equivalency index to the criterion to determine whether the first product and the second product are equivalent.

13. The method in claim 12 wherein the two products are items of manufacture.

14. The method in claim 12 wherein the two products are services.

15. A method for determining two processes, a first process and a second process, as being equal, based on an equivalency index associated with a product-parameter, comprising:

a. identifying at least one measurable product-parameter related to the two processes;

b. measuring the parameter on a first group of products produced with the first process;

c. measuring the parameter on a second group of the products produced with the second process;

d. arranging data of steps b and c in an array having a total number of array elements;

e. providing a numeric upper limit and a numeric lower limit associated with the parameter and relating to the array, the upper limit being greater in magnitude than the lower limit, at least one array element having a magnitude between the upper limit and the lower limit;

f. calculating an equivalency index relating to the quotient of dividing the number of array elements greater in magnitude than the lower limit and smaller in magnitude than the upper limit by the total array elements; and g. providing a criterion and comparing the equivalency index to the criterion to determine whether the first process and the second process are equivalent.

16. The method of claim 15 in which the two processes are for manufacturing a semiconductor integrated circuit devices.

17. The method of claim 15 wherein the products are semiconductor integrated circuit devices.

18. A method for determining a process in two semiconductor integrated-circuit device manufacturing facilities (FABs), a first FAB and a second FAB, as being equal, based on an equivalency index associated with a product-parameter, comprising:

a. identifying at least one measurable product-parameter associated with the process;

b. measuring the parameter on a first group of integrated circuit devices fabricated with the process in the first FAB;

c. measuring the parameter on a second group of integrated circuit devices fabricated with the process in the second FAB;

d. arranging data of steps b and c in an array having a total number of array elements;

e. providing a numeric upper limit and a numeric lower limit associated with the parameter and relating to the array, the upper limit being greater in magnitude than the lower limit, at least one array element having a magnitude between the upper limit and the lower limit;
f. calculating an equivalency index relating to the quotient of dividing the number of array elements greater in magnitude than the lower limit and smaller in magnitude than the upper limit by the total array elements; and
g. providing a criterion and comparing the equivalency index to the criterion to determine whether the process at FAB A and the process at FAB B are equivalent.

19. A method for testing a plurality of groups of products for conforming to parametric limits, based on an equivalency index associated with a parameter common to the products, comprising:
a. identifying at least one measurable parameter common to the products;
b. measuring the parameter on a first group of the plurality of groups of products;
c. measuring the parameter on the remaining groups of products;
d. arranging data of steps b and c in arrays each associated with a group of products, each array having a total number of array elements;
e. providing a numeric upper limit and a numeric lower limit associated with the parameter and relating to the arrays, the upper limit being greater in magnitude than the lower limit;
f. calculating an equivalency index for each array relating to the quotient of dividing the number of each said array elements greater in magnitude than the lower limit and smaller in magnitude than the upper limit by the total elements of said array; and
g. providing a criterion and comparing each equivalency index to the criterion to determine whether the products associated with the index conforms to the parametric limits.

20. The method of claim 19, in which the products are items of manufacture.

21. The method of claim 19, in which the products are services.

22. A method for determining a plurality of processes as being equivalent in quality, based on an equivalency index associated with a product-parameter, comprising:
a. identifying at least one measurable product-parameter associated with the processes;
b. measuring the parameter on a first group of products produced with a first process of the plurality of processes;
c. measuring the parameter on the remaining processes of the plurality of processes;
d. arranging data of steps b and c in arrays each associated with a process, each array having a total number of array elements;
e. providing a numeric upper limit and a numeric lower limit associated with the parameter and relating to the arrays, the upper limit being greater in magnitude than the lower limit;
f. calculating an equivalency index for each array relating to the quotient of dividing the number of each said array elements greater in magnitude than the lower limit and smaller in magnitude than the upper limit by the total elements of said array; and
g. providing a criterion and comparing each equivalency index to the criterion to determine whether the process associated with said index conforms to the criterion.

23. The method in claim 22 wherein the processes are for making semiconductor integrated-circuit devices.

24. The method of claim 22 wherein the products are semiconductor integrated-circuit devices.

* * * * *